G. A. HICKMAN.
CONTROLLING MEANS FOR SPRING OPERATED FAUCETS.
APPLICATION FILED JUNE 28, 1920.

1,387,715.

Patented Aug. 16, 1921.
2 SHEETS—SHEET 2.

WITNESSES

INVENTOR
George A Hickman.
BY
ATTORNEYS

UNITED STATES PATENT OFFICE.

GEORGE ALBERT HICKMAN, OF PEARL RIVER, NEW YORK.

CONTROLLING MEANS FOR SPRING-OPERATED FAUCETS.

1,387,715.

Specification of Letters Patent.  Patented Aug. 16, 1921.

Application filed June 28, 1920. Serial No. 392,194.

*To all whom it may concern:*

Be it known that I, GEORGE ALBERT HICKMAN, a citizen of the United States, and a resident of Pearl River, in the county of Rockland and State of New York, have invented certain new and useful Improvements in Controlling Means for Spring-Operated Faucets, of which the following is a specification.

My invention relates to controlling means for spring operated faucets, and has for its object to provide a device of this character of simple and durable construction, reliable in operation, easy and inexpensive to manufacture and effective to control the flow of fluid from the faucet so as to maintain and vary the flow as desired.

Other objects and advantages reside in certain novel features of construction, arrangement and combination of parts which will be hereinafter more fully described and particularly pointed out in the appended claims, reference being had to the accompanying drawings, forming a part of this specification, and in which—

Fig. 6 is a detail sectional view of the bearing of the swinging cross head in the supporting arm.

Figure 1:
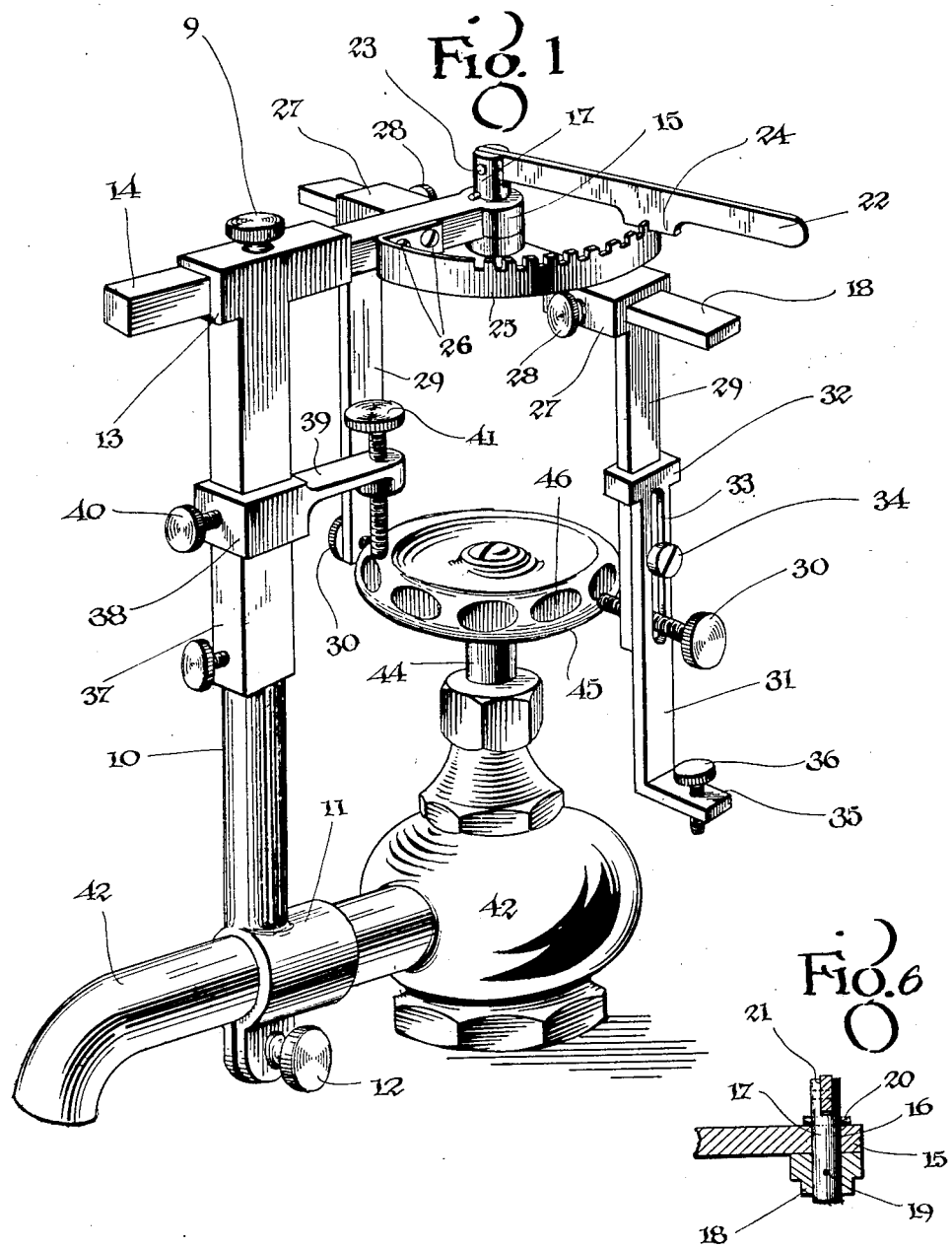
Figure 1 is a perspective view of my invention associated with one conventional form of faucet.

Referring to the drawings, it will be seen that my invention contemplates a telescopic standard 10, adjustable vertically, and having at its lower end a spring clamp 11 adapted to be locked or released by the thumb screw 12, whereby the standard may be adjusted horizontally. The telescopic standard 10 comprises a lower cylindrical portion and an upper squared portion which is telescopically adjustable on the other cylindrical portion, the upper portion being squared for a purpose to hereinafter more fully appear. The upper end of the standard 10 is provided with an elongated squared and horizontally extending bearing 13.

A supporting arm 14 also of square or rectangular cross section is slidably mounted in the squared bearing 13 at the upper end of the standard and is secured in adjusted position in said bearing by means of a lock screw 9. The outer end of the supporting arm 14 is provided with a circular enlargement 15 having an opening 16 therethrough (see Fig. 6). A short shaft 17 is rotatably mounted in the aperture 16 of the circular enlargement of the supporting arm. A swinging cross head 18 is carried by the lower end of the short shaft and is fixed thereto by a pin 19. A cross pin 20 extends through the short shaft and bears against the upper or top surface of the supporting arm, and this cross pin 20 coacts with the cross head to prevent displacement of the shaft 17 from the supporting arm.

The upper end of the short shaft 17 is provided with a longitudinally and diametrically extending slot 21. A locking and operating bar 22 has its inner end received in the slot 21 and has this inner end pivoted to the shaft 17 by means of a pivot pin 23. The lower side of the locking or operating bar is provided with an integral detent 24. A rack segment or quadrant 25 secured, as at 26, to the supporting arm is adapted to coöperate with the detent 24 of the operating bar to maintain the same in adjusted position.

The cross head 18 carries a pair of adjustable clamping members adapted to engage the operating knob, handle or the like of the faucet. Each of these clamping members consists of a saddle 27 slidably mounted on the respective ends of the cross head 18 and secured in adjusted position on the cross head by means of a lock thumb screw 28 carried by the saddle and engageable with the cross head. A clamping bar 29 is integral with and depends from each of the saddles 27. The lower end of the clamping bar 29 carries a clamp screw 30 operative to directly engage the operating knob, handle or the like of the faucet.

One of the clamp bars 29 carries an extension 31 having a small saddle 32 slidably mounted on the clamp bar 29 and provided with an elongated slot 33 to accommodate the clamp screw 30 and also an adjusting screw 34 which serves to secure the extension 31 in adjusted position. The extension 31 is provided at its lower end with an outwardly extending portion 35 preferably disposed at right angles to the main portion of the extension 31. The portion 35 is also provided with a clamp screw 36 also adapted to engage the operating knob, handle or the like of certain forms of spring faucets.

The square portion 37 of the standard 10 slidably receives the saddle 38 of a clamp 39. A lock thumb screw or adjusting screw 40 is carried by the saddle 38 and is adapted to engage the portion 37 of the standard to lock the clamp in adjusted position. The outer end of the clamp 39 carries a clamp screw 41 adapted to engage the operating handle, knob or the like of certain forms of faucets.

Referring to the drawing, it will be seen that all of the faucets with which my invention is adapted to be used are of the spring operated type and include a body 42 which includes the spring seated valve mechanism (not shown) and a nozzle 43 from which the liquid is discharged. Various types of valve operating means are shown and all of these have in common the feature of being automatically thrown by a spring to closed position as soon as released. As shown in Fig. 1, the operating means consists of a knob 45 carried at the upper end of the valve stem 44. The periphery of the knob is preferably provided with a circular series of depressions 46. With this form of operating means the clamping screws 30 are adapted to directly engage the periphery of the knob 45, these clamping screws 30 engaging the knob at diametrically opposite points.

In operation, with this form of the invention, the supporting arm having been adjusted in its bearing 13 and the clamping bars 29 having been adjusted on the cross head, the clamping screws 30 are turned into engagement with the periphery of the operating knob until they firmly grip the same. The operating bar 22 may be then turned to rotate the knob and the valve stem against the spring action of the faucet. When the desired flow from the nozzle 42 of the faucet is obtained the detent 24 of the operating bar is moved into engagement with the rack segment or quadrant to lock the operating bar in position to maintain the flow. The flow can be varied as desired by a simple adjustment of the operating bar in the rack 25.

Figure 3:
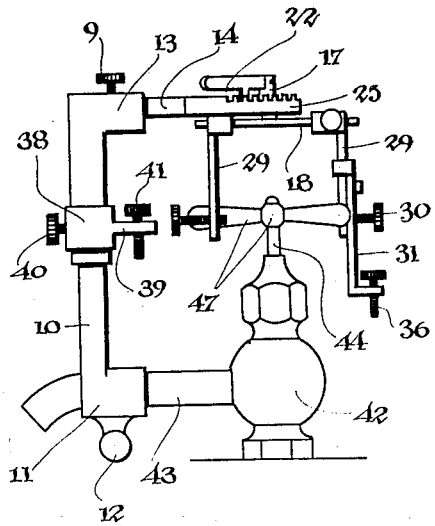
Fig. 3 is a similar view of the invention associated with another form of faucet.

In Fig. 3 the invention is shown associated with a similar but slightly different form of spring operated faucet, the operating means in this instance consisting of cross handles 47. The operation of this form of invention is precisely the same as the operation of the form shown in Fig. 1 except that it is not necessary to bring the clamping screws 30 into action as the clamping bars 29 extend between the cross handles of the operating means and bear directly against the same. Thus when the operating bar 22 is adjusted the clamping bars 29 effect the desired adjustment of the cross handles constituting the operating means for the faucet.

Figure 2:
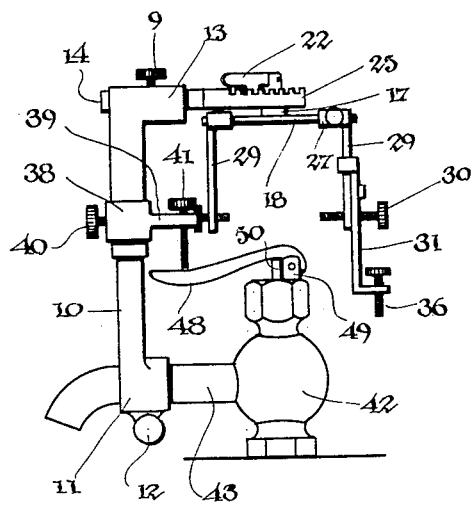
Fig. 2 is a side elevational view of the invention associated with another form of faucet.
Figure 4:
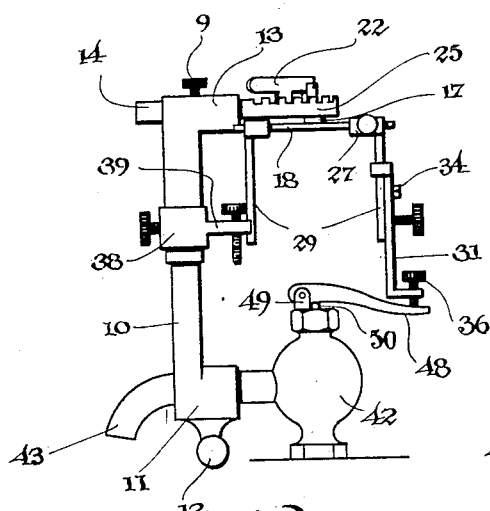
Fig. 4 is a similar view showing the invention associated with another form of faucet.
Figure 5:
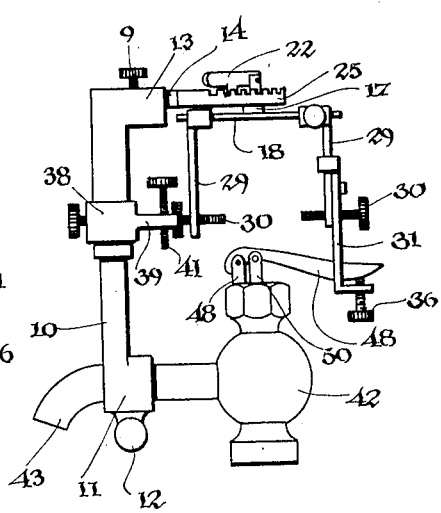
Fig. 5 is a similar view showing a modified arrangement of the invention with another form of faucet.

In Figs. 2, 4 and 5 I have shown my invention associated with a more radically different form of spring operated faucet which involves a vertically swinging lever 48 fulcrumed at 49 to the body portion of the faucet and connected to and controlling a spring actuating reciprocating valve stem 50. By referring to the drawings it will be noted that in Figs. 2 and 4 the operating lever 48 of the faucet must be depressed in order to obtain a flow through the nozzle 43 of the faucet, while in Fig. 5 the operating lever 48 must be raised in order to obtain a flow through the faucet.

In the form of my invention shown in Fig. 2 the clamp member 39 is adapted to effect the desired adjustment of the operating means of the faucet and to effect this purpose the saddle 38 thereof is adjusted along the standard 10 and secured in adjusted position by the screw 40. The clamping screw 41 is then turned in the clamp member until it depresses the operating lever 48 of the faucet to the desired degree. A simple adjustment of the screw 41 varies the flow from the nozzle of the faucet as desired.

In the form of my invention shown in Fig. 4 as the operating lever 48 extends away from the standard the clamping screw 36 carried by the extension 31 is adapted to engage the operating lever to adjust and maintain the same in desired position, it being understood that the extension may be extended and maintained in adjusted position on the clamping bar 29 by means of the adjusting screw 34.

In the form of my invention shown in Fig. 5 the clamping screw 36 carried by the extension 31 is inverted and bears upwardly against the operating lever 48 so as to raise the same to the desired degree to effect the desired control of the operating means of the faucet.

In all forms of the invention the operating means for the faucet is directly and positively engaged and may be readily and easily moved to and maintained in desired position. Moreover, the control of the operating means is flexible and variable at all times and under the complete control of the operator, whereby the desired flow from the faucet may be obtained.

The words "clamp" and "clamping" are used herein in their broad or generic sense to signify a means or something which is itself rigid and which secures or holds something else and the action of such means, respectively.

I claim:

1. Controlling means for faucets having a nozzle and a spring closed valve and operating handle, consisting of a standard having its lower end adapted to be clamped to the nozzle and having a bearing at its upper end, a supporting arm slidably mounted in the bearing of the standard, means for securing said supporting arm in adjusted position in said bearing, a swinging cross head carried by the outer end of said supporting arm, an operating bar for said cross head, a rack segment carried by the supporting arm and coacting with the operating bar to maintain the same in adjusted position, a pair of adjustable clamping bars carried by the cross head, and a clamping screw carried by each of the clamping bars and engageable with the operating handle of the faucet.

2. Controlling means for spring operated faucets consisting of a standard, a supporting arm slidably mounted in said standard, means for securing said supporting arm in adjusted position, a swinging cross head carried by the outer end of said supporting arm, an operating bar for said cross head, means for maintaining said operating bar in adjusted position, a clamping member mounted on said cross head, and a clamping screw carried by said clamping member.

3. Controlling means for spring operated faucets having a nozzle and a spring closed valve and operating means, consisting of a standard having its lower end adapted to be clamped to the nozzle, an adjustable clamping member carried by the standard, means for securing the clamping member in adjusted position, and a clamping screw carried by the clamping member and engageable with the operating means of the faucet.

4. Controlling means for spring operated faucets consisting of a standard, a supporting arm adjustably mounted on said standard, a swinging cross head carried by the supporting arm, operating means for the swinging cross head, means for securing the operating means and cross head in adjusted position, a clamping bar adjustably mounted on the cross head, an extension slidably mounted on the clamping bar, and a clamping screw adapted to engage the spring faucet.

5. Controlling means for spring operated faucets including a standard, a swinging cross head carried by the standard, an operating bar for said swinging cross head, a rack segment for maintaining said operating bar in adjusted position, and a clamping member carried by the cross head.

6. Controlling means for spring operated faucets including a swinging cross head, a clamping bar carried by said cross head and a clamping screw carried by the clamping bar for engaging the spring faucet.

7. Controlling means for a spring operated faucet includnig a standard, a supporting arm carried by said standard, a swinging cross head carried by the supporting arm, operating means for the swinging cross head, a clamping member carried by the swinging cross head, and a clamping screw carried by the clamping member and engageable with the operating means for the faucet.

8. Controlling means for spring operated faucets including a swinging cross head, operating means for the cross head, a clamping member carried by the cross head and consisting of a saddle slidably mounted on the cross head and a depending clamping bar integral with the saddle, and a clamping screw carried by the clamping bar.

9. Controlling means for faucets having a nozzle and spring closed valve and an operating handle consisting of a standard having its lower end adapted to be clamped to the nozzle, a clamping member carried by the standard and adjustable with respect thereto, means for securing the clamping member in adjusted position, and a clamping screw carried by the clamping member and engageable with the operating handle of the faucet.

GEORGE ALBERT HICKMAN.